US008513618B2

(12) United States Patent
Maniscalco et al.

(10) Patent No.: US 8,513,618 B2
(45) Date of Patent: Aug. 20, 2013

(54) RADIOACTIVE ANOMALY DISCRIMINATION FROM SPECTRAL RATIOS

(75) Inventors: James Maniscalco, Laquinta, CA (US); Glenn Sjoden, Sandy Springs, GA (US); Mac Clements Chapman, Ranchos Palos Verdes, CA (US)

(73) Assignee: Quintell of Ohio, LLC, Beachwood, OH (US)

( * ) Notice: Subject to any disclaimer, the term of this patent is extended or adjusted under 35 U.S.C. 154(b) by 0 days.

(21) Appl. No.: 13/338,538

(22) Filed: Dec. 28, 2011

(65) Prior Publication Data

US 2012/0161028 A1    Jun. 28, 2012

Related U.S. Application Data

(60) Provisional application No. 61/427,687, filed on Dec. 28, 2010.

(51) Int. Cl.
*G01T 1/17*    (2006.01)

(52) U.S. Cl.
CPC ........................................ *G01T 1/17* (2013.01)
USPC ............................................................ 250/395

(58) Field of Classification Search
USPC ............................................................ 250/395
See application file for complete search history.

(56) References Cited

U.S. PATENT DOCUMENTS

| | | | |
|---|---|---|---|
| 3,389,254 A * | 6/1968 | Russell | 250/362 |
| 3,399,302 A * | 8/1968 | Carrell | 250/390.04 |
| 4,319,229 A | 3/1982 | Kirkor | |
| 4,629,600 A | 12/1986 | Ishiguro et al. | |
| 4,663,623 A | 5/1987 | Lax et al. | |
| 5,479,023 A | 12/1995 | Bartle et al. | |
| 5,485,154 A | 1/1996 | Brooks et al. | |
| 5,615,247 A | 3/1997 | Mills | |
| 5,650,928 A | 7/1997 | Hagenbuch | |

(Continued)

FOREIGN PATENT DOCUMENTS

| | | |
|---|---|---|
| HU | 72784 | 5/1996 |
| HU | 220207 | 11/2001 |

(Continued)

OTHER PUBLICATIONS

Nguyen, "Age-dating of highly enriched Uranium by gamma-spectrometry" Nuclear Instruments and Methods in Physics Research B 229 (2005) 103-110.*

(Continued)

*Primary Examiner* — David Porta
*Assistant Examiner* — Edwin Gunberg
(74) *Attorney, Agent, or Firm* — Panitch Schwarze Belisario & Nadel LLP

(57) ABSTRACT

A method for discriminating a radioactive anomaly from naturally occurring radioactive materials includes detecting a first number of gamma photons having energies in a first range of energy values within a predetermined period of time and detecting a second number of gamma photons having energies in a second range of energy values within the predetermined period of time. The method further includes determining, in a controller, a ratio of the first number of gamma photons having energies in the first range and the second number of gamma photons having energies in the second range, and determining that a radioactive anomaly is present when the ratio exceeds a threshold value.

19 Claims, 13 Drawing Sheets

(56) References Cited

U.S. PATENT DOCUMENTS

| | | | |
|---|---|---|---|
| 5,828,220 | A | 10/1998 | Carney et al. |
| 5,939,982 | A | 8/1999 | Gagnon et al. |
| 5,982,838 | A | 11/1999 | Vourvopoulos |
| 6,031,454 | A | 2/2000 | Lovejoy et al. |
| 6,225,901 | B1 | 5/2001 | Kail, IV |
| 6,356,802 | B1 | 3/2002 | Takehara et al. |
| 6,429,810 | B1 | 8/2002 | De Roche |
| 6,624,760 | B1 | 9/2003 | Kinzel et al. |
| 6,768,421 | B1 | 7/2004 | Alioto et al. |
| 6,891,470 | B2 | 5/2005 | Bohinc, Jr. |
| 6,919,803 | B2 | 7/2005 | Breed |
| 6,937,692 | B2 | 8/2005 | Johnson et al. |
| 7,026,944 | B2 | 4/2006 | Alioto et al. |
| 7,030,755 | B2 | 4/2006 | Bohinc, Jr. |
| 7,116,235 | B2 | 10/2006 | Alioto et al. |
| 7,190,265 | B1 | 3/2007 | Bohinc, Jr. |
| 7,220,967 | B1 | 5/2007 | Shapiro et al. |
| 7,545,268 | B2 | 6/2009 | Bohinc |
| 2003/0137968 | A1 | 7/2003 | Lareau et al. |
| 2003/0149526 | A1 | 8/2003 | Zhou et al. |
| 2004/0195517 | A1 | 10/2004 | Rowland et al. |
| 2005/0156734 | A1 | 7/2005 | Zerwekh et al. |
| 2005/0275545 | A1* | 12/2005 | Alioto et al. ................. 340/600 |
| 2007/0023714 | A1 | 2/2007 | Bohinc |
| 2010/0168947 | A1 | 7/2010 | Winso et al. |
| 2010/0226580 | A1 | 9/2010 | Frank |

FOREIGN PATENT DOCUMENTS

| | | |
|---|---|---|
| JP | 0540191 | 2/1993 |
| JP | 07035868 A | 2/1995 |
| JP | 2001311791 A | 11/2001 |

OTHER PUBLICATIONS

"Gamma Ray Gauging", Measurement Fabrication GRG. IBM Technical Disclosure Bulletin, Mar. 1971, p. 2864.

Lawrence Livermore National Laboratory Radiation Detection Center web-site www.llnl.gov/llnl/06news/handouts/radiation det ctr.pdf <http://www.llnl.gov/llnl/06news/handouts/radiation det ctr.pdf>, "Technology Fact Sheet".

It's China web-site <http://china.tyfo.com/china/block/html/2003022600680.html>, "U.S. Ports Vulnerable to Attack—Intelligence", Aug. 13, 2003.

Cuneo, Eileen C., informationweek.com web-site http://www.informationweek.com/story/Article.jhtml?articleID+8700375, "Safe at Sea", Apr. 7, 2003.

ORTEC web-site <http://www.ortec-online.com/detective.htm>, "Detective" product description.

Dye, David H., "Sensors for Screening and Surveillance", < <http://www-hoover.stanford.edu/research/conferences/nsf02/dye.pdf>>, presented at the Hoover Institute National Security Forum, "Conference on Technology for Preventing Terrorism", Mar. 2003.

International Search Report and Written Opinion issued May 8, 2012 in Intl. Application No. PCT/US2011/067557.

Canberra web-site <http://www.canberra.com/products/538.asp>, "ADM-606M Multi-Purpose Radiation Monitor".

* cited by examiner

RADIOACTIVE ANOMALY DISCRIMINATION FROM SPECTRAL RATIOS

CROSS-REFERENCE TO RELATED APPLICATIONS

This application claims the benefit of U.S. Provisional Patent Application No. 61/427,687, currently pending, filed on Dec. 28, 2010, entitled, "HEU Discrimination from Spectral Ratios," the entire contents of which are incorporated by reference herein. application.

STATEMENT REGARDING FEDERALLY SPONSORED RESEARCH OR DEVELOPMENT

At least a portion of this invention was made with Government support under Cooperative Agreement No. DE-FC52-09NA29293 with the Department of Energy and the National Nuclear Security Administration. The Government may have certain rights in this application.

BACKGROUND OF THE INVENTION

An embodiment of the present invention relates generally to a method for discriminating radioactive anomalies from naturally occurring radioactive materials, and more particularly, to a method for discriminating highly enriched uranium (HEU) or other weapons grade radioactive materials from naturally occurring radioactive materials.

There is a growing concern that terrorists or others may at some time in the near future attempt to import into the United States or some other country radioactive or nuclear material which may then be used for the construction of a nuclear weapon for carrying out terrorist objectives. One way of shipping such radioactive or nuclear material is to hide the material among or within seemingly innocuous cargo or naturally occurring radioactive materials. For example, such nuclear material could be placed within a standard, sealed cargo container of the type typically employed for shipping cargo by sea, rail, air or by truck. The nuclear material could be positioned within such a sealed cargo container, and may be shielded to avoid detection. Shielded HEU masked by naturally occurring radioactive materials is the most challenging detection problem.

It is therefore desirable to provide a reliable method of discriminating HEU or other radioactive materials of interest from naturally occurring radioactive materials.

SUMMARY OF THE INVENTION

An embodiment of the present invention is directed to a method for discriminating a radioactive anomaly from naturally occurring radioactive materials. The method includes detecting a first number of gamma photons having energies in a first range of energy values within a predetermined period of time and detecting a second number of gamma photons having energies in a second range of energy values within the predetermined period of time. The method further includes determining, in a controller, a ratio of the first number of gamma photons having energies in the first range and the second number of gamma photons having energies in the second range, and determining that a radioactive anomaly is present when the ratio exceeds a threshold value.

Another embodiment of the present invention is directed to a method for determining the presence or absence of an expected radiation source. The method includes placing at least one radioactive material detection apparatus on an object containing the expected radiation source. The at least one radioactive material detection apparatus detects a first number of gamma photons emitted by the expected radiation source having energies in a first range of energy values within a predetermined period of time and a second number of gamma photons emitted by the expected radiation source having energies in a second range of energy values within the predetermined period of time. The method further includes determining, in a controller, a ratio of the first number of gamma photons having energies in the first range and the second number of gamma photons having energies in the second range, and comparing the determined ratio of the first and second numbers of gamma photons with an expected ratio of the first and second numbers of gamma photons for the expected radiation source.

Still another embodiment of the present invention is directed to a system for discriminating a radioactive anomaly from naturally occurring radioactive materials. The system includes at least one radioactive material detection apparatus configured to detect a first number of gamma photons having energies in a first range of energy values within a predetermined period of time and a second number of gamma photons having energies in a second range of energy values within the predetermined period of time. A controller configured to (i) determine a ratio of the first number of gamma photons having energies in the first range and the second number of gamma photons having energies in the second range, and (ii) compare the determined ratio with a threshold value.

BRIEF DESCRIPTION OF THE DRAWINGS

The foregoing summary, as well as the following detailed description of preferred embodiments of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

DETAILED DESCRIPTION OF THE INVENTION

Figure 1:
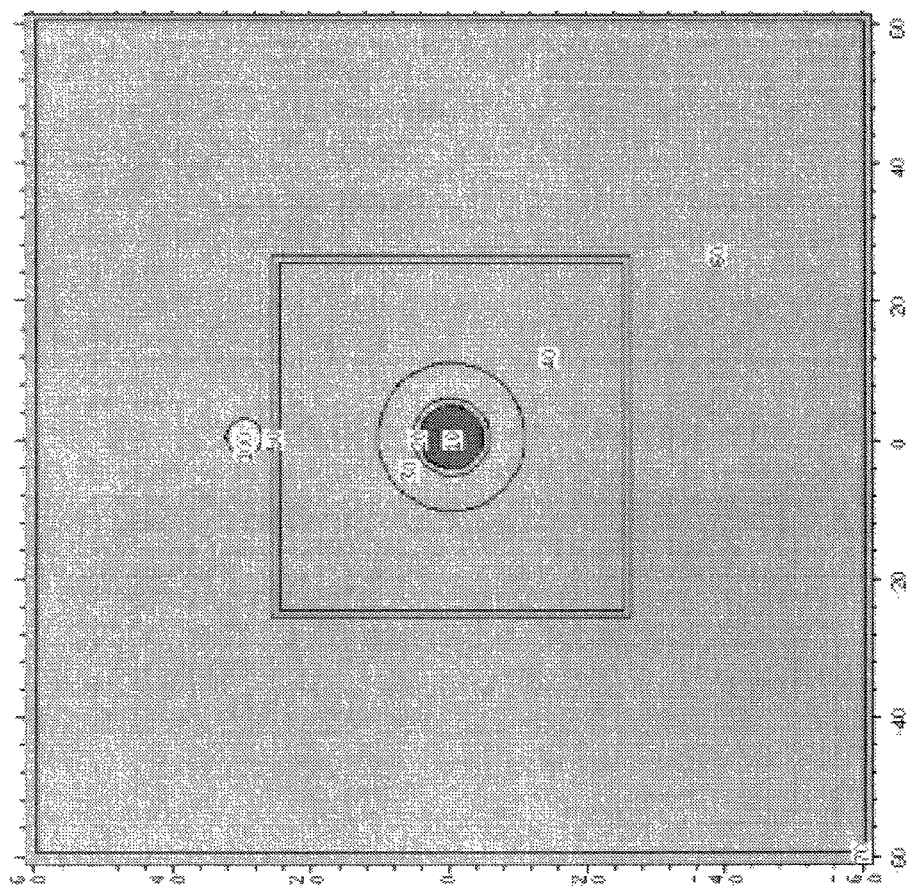
FIG. 1 is a diagrammatic view of a hypothetical "air box" placed approximately 30 cm from a plutonium solid core canned in aluminum.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

High energy gamma rays from aged HEU are detectable with long dwell detectors (i.e., sensors positioned to capture gamma rays or other particles emitted by radioactive material over an extended period of time). It has been found that, for approximately one year old HEU, important gamma lines (mostly from protactinium-234 (Pa-234) and uranium-238 (U-238)) are located at 742, 766, 883, 926, 946 and 1001 kilo-electron volts (keV). By contrast, approximately fifty year old HEU, the most prominent gamma lines appear at 1120, 1238, 1764, and 2204 keV (mostly from bismuth-214 (Bi-214)).

As a result, the spectrum of detected gamma energies sensed at one or more detectors may be separated into sections and compared with one another to determine characteristic ratios.

A particularly useful method for distinguishing HEU and naturally occurring radioactive material (NORM) compares the gamma counts in the range of 830-1060 keV with gamma counts in the range of 1060-3000 keV. For example, for one year old HEU the ratio of gamma source leakage in the 830-1060 keV range to gamma source leakage in the 1060-3000 keV range has been found to be approximately 3.40. For fifty year old HEU, this ratio drops significantly to approximately 0.84. Using NORM (aged approximately 2.2 billion years with 13.7 parts-per-million (ppm) U, 16.1 ppm thorium (Th) and 0.02 ppm potassium (K)), a ratio of approximately 0.43 has been found. There are NORM materials that have modified mixtures of isotopes from selected mineral deposits or other types of shipments. The numerator of the ratio is typically determined in part by the target radioactive material, and the denominator range defined by the type of NORM expected. A series of ratios can be designed and maximized and easily run sequentially to cover different possibilities. For example a ratio could be specifically designed for inspection of banana shipments which contain radioactive K isotopes.

It is understood by one skilled in the art that embodiments of the invention are not limited to a ratio comparing the above-described ranges. Each range may be limited to a single spectrum line. However, it is preferable that the selected ranges encompass a wide selection of gamma energies to lessen sensing time, improve count accuracies, and optimize performance for detector design and software. In addition, each selected range may be non-contiguous. For example, a first range may include counts for individually selected gamma energy lines.

These gamma source ratios can be used to identify a young HEU signal even in natural uranium and NORM bearing cargo. The use of gamma source ratios as a method for discriminating HEU from NORM has been confirmed through testing of an HEU surrogate source, as described below. The method can be implemented in a single radiation sensor or detector, but may also be implemented using two or more radiation sensors/detectors, which may be placed at various locations.

Shielded HEU masked by NORM in cargo is the most challenging detection problem. In a test example, young HEU (HEU purified less than 20 years ago) is discriminated from NORM by the ratio of gammas from Pa-234 and U-238 in the 830-1060 keV range to gammas from Bi-214 in the 1060-3000 keV range. As shown above, the ratio is lowest for NORM and eight times larger for one year old HEU. This approach has been validated in HEU surrogate source testing with cat litter. The natural uranium metal rods used in as a surrogate source are fifty years old +/-10% (since separated at Savannah River National Laboratory). The ratios of the gamma spectral regions of interest (ROI) for HEU are shown in Table 1. The first three rows in Table 1 are the calculated gamma ratios for one year old HEU, fifty year old HEU, and 2.2 billion year old NORM. HEU and natural uranium metal rods will have the same expected ratios for the selected gamma ROIs. The fourth row is the experimental gamma ratio result obtained in the cat litter tests for the detector closest to the source. These results show a positive detection/discrimination of the fifty year old source because the gamma ratios obtained in the tests closely match the expected/calculated gamma ratios for fifty year old uranium material.

TABLE 1

Ratios of Gamma Spectral Regions of Interest (ROI) in HEU compared with cat litter shielded HEU testing

| | Ratio (830-1060 keV)/ (700-3000 keV) | Ratio (830-1060 keV)/ (1060-3000 keV) |
|---|---|---|
| 1 y HEU | 0.55 | 3.40 |
| 50 y HEU | 0.37 | 0.84 |
| NORM | 0.26 | 0.43 |
| 50 y Rods | 0.35 +/- 0.04 (1-sigma) | 0.91 +/- 0.09 (1-sigma) |

A similar case with 5 cm of lead added in front of the cat litter was also tested. In this test, the gamma ratio of (830-1060 keV)/(1060-3000 keV) was shown to be approximately 0.53+/-0.05. This gamma ratio lies in between the expected values for 50 year old HEU and NORM and could be a large enough variance from the expected gamma ratio to subject the container to additional inspection/analysis. More importantly, as uranium gets "younger" (less than 20 years since purification), the gamma ratio differences with NORM become much larger, as shown in Table 1.

Triangulation can also be used to discriminate a concentrated source of U-238 from dilute sources of NORM if the cargo with NORM is uniformly loaded. In this case, the number of counts for 830-1060 keV gammas from a concentrated HEU source will vary on the container detectors, with the closest detectors showing the most counts.

Several optimization studies were performed to assess how to approach capturing the detailed gamma and neutron signatures from the various sources to be considered to the greatest extent possible. While there are many resources available, the most comprehensive source terms that distinctly account for decay and all radiation from daughter nuclides as a function of energy can be generated using the Oak Ridge National Laboratory SCALE6 code system. Initial gamma calculations for the HEU and weapons grade plutonium (WGPu) considered high resolution 1 keV binning and material age, where "age" in this context refers to time passing for the material as a final product since laboratory refinement and separation.

For HEU, one year old and fifty year old materials were uitilized as test samples; "freshly" separated one year old material and "aged" fifty year old material differ in total activity from "nature aged" uranium in NORM. The primary effect is due to in growth of decay daughters, examples of which include Pa-234, Pa-234m, and Bi-214 isotopes. Aged material is easier to detect than freshly purified material, and this will be discussed later.

For WGPu, 22.5 year old materials were utilized as test samples, since the average age of Pu typically falls between twenty and twenty-five years.

Intrinsic sources were generated for: 25 kg of 90% HEU (U-234 0.83%, U-235 90.00%, U-236 0.66%, U-238 8.50%); and 8 kg of WGPu (Pu-238 0.02%, Pu-239 93.279%, Pu-240 5.911%, Pu-241 0.200%, Pu-242 0.028%, Am-241 0.256%).

Figure 2:
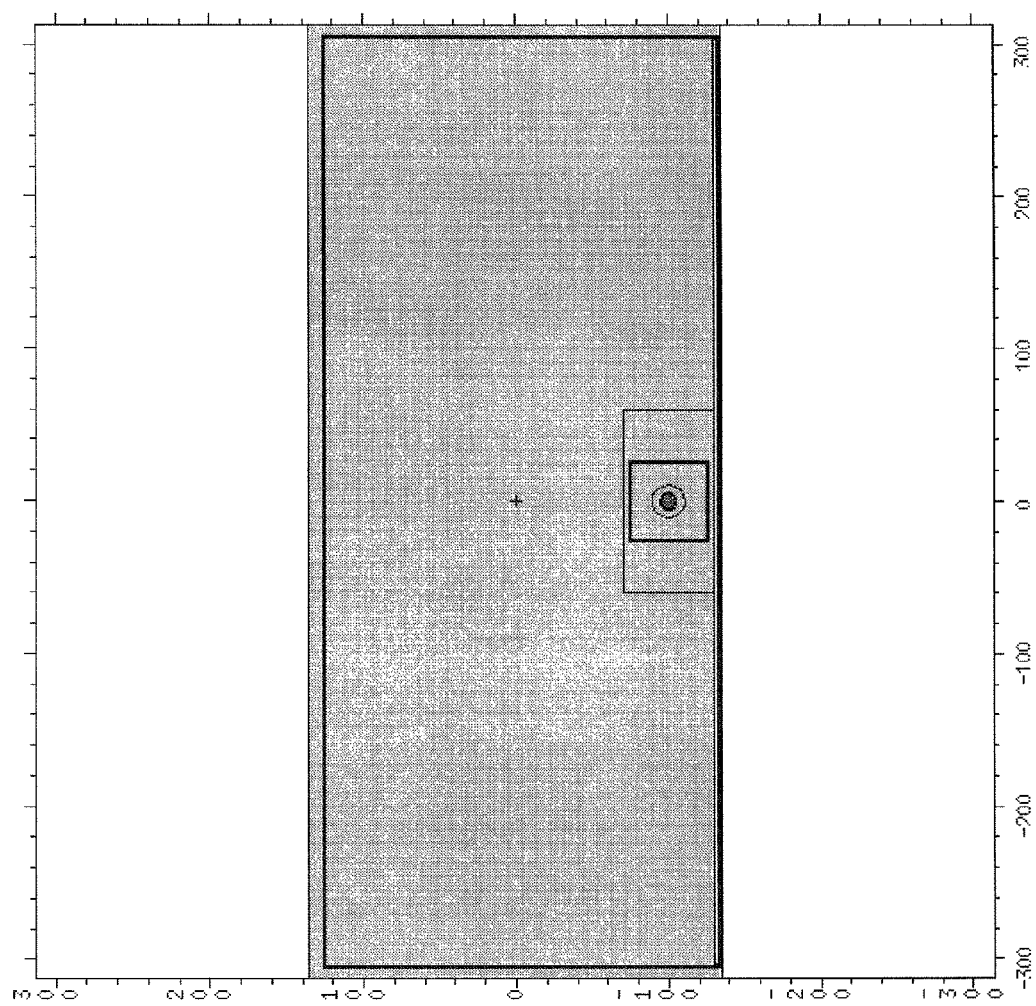
FIG. 2 is a diagrammatic view of the air box of FIG. 1 located in a shipping container.

The X-Y plot in FIG. 1 depicts one hypothetical "air box" placed approximately 30 cm from the Pu solid core canned in aluminum (Al). This is one of many large MCNP5 models (X-Z Plot) used to analyze the scenarios considered, located inside a shipping container, as shown in FIG. 2. All dimensions are in centimeters.

Several source and cargo shielding scenarios were considered. HEU is the most challenging special nuclear material (SNM) material to detect since the predominant 186 keV gamma radiation from U-235 is easily shielded. Special attention was paid to gamma energies greater than 1 MeV with excellent shielding penetration potential under "long dwell" counting scenarios. The top 20 intrinsic gammas at energies greater than 1 MeV are listed in Table 2 for WGPu (8 kg, aged 22.5 years), natural uranium (NatU) (1.7 kg, aged 50 years), and HEU (25 kg, aged 50 years) sources.

For comparison, gamma ray yields for the 25 kg HEU solid and shell core gamma intrinsic source spheres, canned with 1 cm aluminum, and aged for 50 years were computed. The spectrum from HEU is described below and shown herein as optimized for computation by analysis of a 3000 (1 keV) source bin structure, later reduced for computational efficiency to approximately 1100 bins. The results were rendered by a high fidelity MCNP5 Monte Carlo (continuous energy cross sections) model. Presented here is the energy dependent leakage due to instrinsic gamma radiation leaking out from just one side panel (+x) of the "source box" in FIG. 1 with the panel center at a radius of 25 cm from the origin of the centrally placed source. In this case, each side panel of the square source box has overall dimensions 50 cm×50 cm; this was later increased to 60 cm×60 cm to accommodate additional direct source shielding and packaging scenarios. For the calculations, the following data applies:

Solid core: While average statistical convergence for the solid core was 3.64% relative error considering all energies, most of the predominant gamma lines were converged to <1% relative error using the MCNP5 Monte Carlo code with continuous energy cross sections; to achieve these reasonably converged statistics throughout all energies, the solid pack HEU source was executed on HSWT's Viper cluster using 23.4 billion histories.

Shell Core: While average statistical convergence for the solid core was 2.45% relative error considering all energies, most of the predominant gamma lines were converged to <1% relative error using the MCNP5 Monte Carlo code with continuous energy cross sections; to achieve these reasonably converged statistics throughout all energies, the shell HEU source (ri=12.458 cm, ro=13.087 cm) was executed on HSWT's Viper cluster using 26.3 billion histories.

For intrinsic gammas 1 MeV or greater, the relative ratio of shell/solid gamma rays leaking at the source box averaged 3.19.

TABLE 2

Top 20 Gamma Lines > 1 MeV intrinsic to each material (8 kg WGPu aged 22.5 yrs., 1.7 kg NatU aged 50 yrs., 25 kg HEU aged 50 yrs.)

| Top Pu gammas | | >1 MeV | Top NatU (L-heu) gammas | | >1 MeV | Top HEU gammas | | >1 MeV |
|---|---|---|---|---|---|---|---|---|
| MeV | Prob | gam/s | MeV | Prob | gam/s | MeV | Prob | gam/s |
| 1.249 | 5.901E−08 | 251700.000 | 1.000 | 5.678E−03 | 61780.000 | 1.000 | 8.325E−06 | 78050.451 |
| 1.250 | 5.897E−08 | 251500.000 | 1.001 | 5.672E−03 | 61720.000 | 1.001 | 8.316E−06 | 77969.818 |
| 1.749 | 2.839E−08 | 121100.000 | 1.738 | 2.731E−04 | 2972.000 | 1.764 | 4.023E−06 | 37720.103 |
| 1.750 | 2.839E−08 | 121100.000 | 1.831 | 2.154E−04 | 2344.000 | 1.120 | 3.833E−06 | 35939.623 |
| 1.750 | 2.839E−08 | 121100.000 | 1.831 | 2.154E−04 | 2344.000 | 1.120 | 3.833E−06 | 35939.623 |
| 1.750 | 2.839E−08 | 121100.000 | 1.831 | 2.154E−04 | 2344.000 | 1.120 | 3.833E−06 | 35939.623 |
| 2.249 | 1.624E−08 | 69250.000 | 1.510 | 1.751E−04 | 1905.000 | 1.238 | 1.494E−06 | 14010.377 |
| 2.250 | 1.623E−08 | 69220.000 | 1.193 | 1.731E−04 | 1884.000 | 2.204 | 1.262E−06 | 11829.548 |
| 2.749 | 9.299E−09 | 39660.000 | 1.554 | 1.211E−04 | 1318.000 | 1.377 | 1.016E−06 | 9524.956 |
| 2.750 | 9.297E−09 | 39650.000 | 1.765 | 1.174E−04 | 1277.000 | 1.729 | 7.700E−07 | 7218.959 |
| 1.057 | 1.806E−09 | 7704.000 | 1.434 | 1.116E−04 | 1214.000 | 1.509 | 5.537E−07 | 5190.956 |
| 1.000 | 1.554E−09 | 6626.000 | 1.875 | 1.058E−04 | 1151.000 | 1.847 | 5.364E−07 | 5029.035 |
| 1.001 | 1.552E−09 | 6620.000 | 1.868 | 1.019E−04 | 1109.000 | 1.155 | 4.271E−07 | 4003.970 |
| 1.005 | 7.229E−10 | 3083.000 | 1.394 | 7.500E−05 | 816.100 | 1.738 | 4.005E−07 | 3755.040 |
| 1.014 | 5.740E−10 | 2448.000 | 1.911 | 7.119E−05 | 774.600 | 2.447 | 3.924E−07 | 3679.002 |
| 1.009 | 5.620E−10 | 2397.000 | 1.237 | 6.925E−05 | 753.500 | 1.401 | 3.502E−07 | 3282.964 |
| 1.041 | 5.573E−10 | 2377.000 | 1.593 | 6.696E−05 | 728.600 | 1.831 | 3.159E−07 | 2962.028 |
| 1.085 | 2.191E−10 | 934.300 | 1.125 | 6.330E−05 | 688.800 | 1.407 | 3.130E−07 | 2935.025 |
| 1.738 | 7.690E−12 | 32.800 | 1.353 | 4.674E−05 | 508.600 | 1.408 | 3.128E−07 | 2932.963 |
| 1.831 | 6.066E−12 | 25.870 | 1.937 | 4.165E−05 | 453.200 | 2.118 | 3.055E−07 | 2863.956 |
| 1.510 | 4.928E−12 | 21.020 | 1.694 | 3.616E−05 | 393.500 | 1.661 | 2.905E−07 | 2723.974 |
| 1.193 | 4.877E−12 | 20.800 | 1.759 | 3.077E−05 | 334.800 | 1.510 | 2.566E−07 | 2406.038 |

The comparison of high energy gamma ray leakage from one single panel of a source box from an HEU solid core sphere (25 kg) versus an HEU shell configuration (25 kg) is presented in Table 3. Yields for the 25 kg HEU solid core gamma intrinsic source spheres, canned with 1 cm aluminum, and aged for 1 year since separation and 50 years since separation are compared below following computational optimization starting with a 3000 (1 keV) source bin structure, later reduced for computational efficiency to approximately 1100 bins; the results were rendered by a high fidelity MCNP5 Monte Carlo (continuous energy cross sections) model. Note from this data there is a large difference between one year and fifty year aged HEU materials, and relative ratios of high energy gammas may be used to define the material. Source localization in a container for such sources would be determined by relative detector response based on placement on the container.

Figure 3:
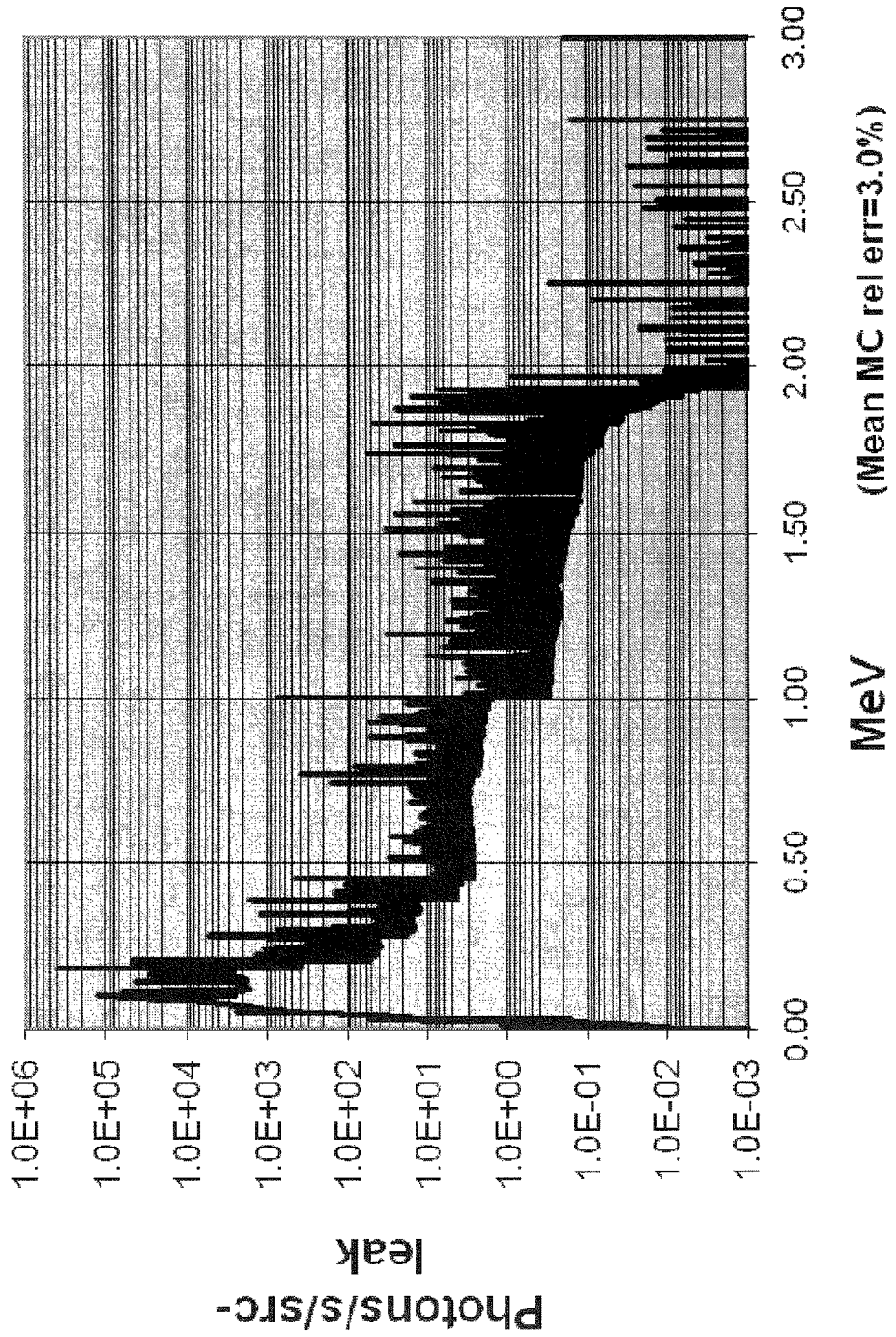
FIG. 3 is a plot of gamma energy leakage from a 25 kg one year aged HEU solid sphere at the source box.
Figure 4:
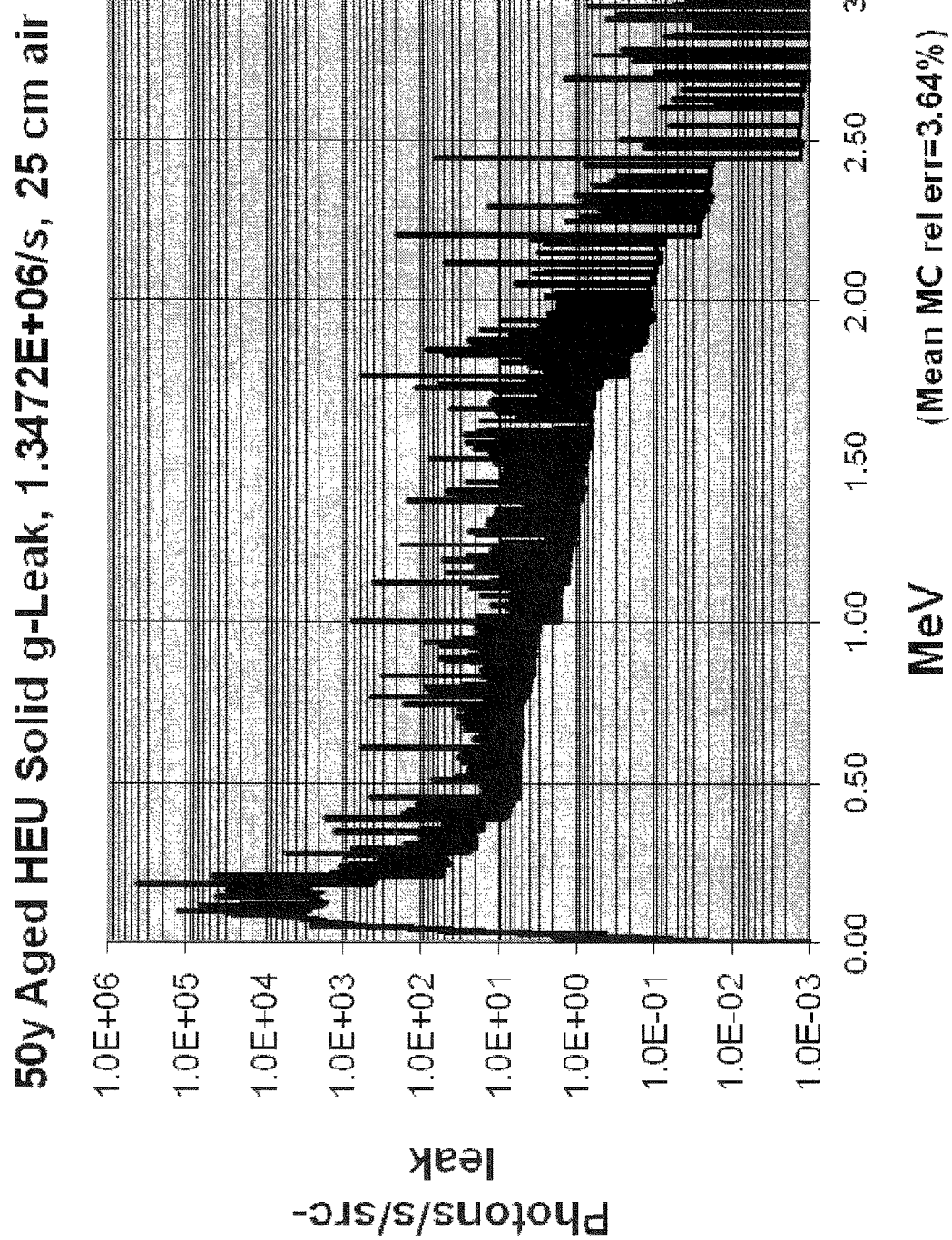
FIG. 4 is a plot of gamma energy leakage from a 25 kg, fifty year aged HEU solid sphere at the source box.

The energy dependent leakage due to instrinsic gamma radiation leaking out from just one side panel (+x) of a "source box" with the panel center at a radius of 25 cm from the origin of the centrally placed source is given in FIGS. 3 and 4. Each side panel of the square source box has overall dimensions 50 cm×50 cm.

The total leakage over all energies streaming out of the Al spherical case on one planar surface set across a 50 cm×50 cm surface is similar for the two aged masses, dominated by the lower energies.

The following important trends for aged HEU have been found. First, protactinium gammas in the decay series for uranium (Pa-234/234m) reach decay series equilibrium quickly, with emissions becoming fairly constant between one year and fifty years. Further, bismuth gamma (Bi-214) emission rates are extremely sensitive to material age, ramping up with aged material. Finally, relative to the fifty year decay emissions, bismuth (Bi-214) requires nearly twenty years to reach just under 20% of the fifty year emission level, then subsequently ramps almost linearly relative to the fifty year level.

Figure 5:
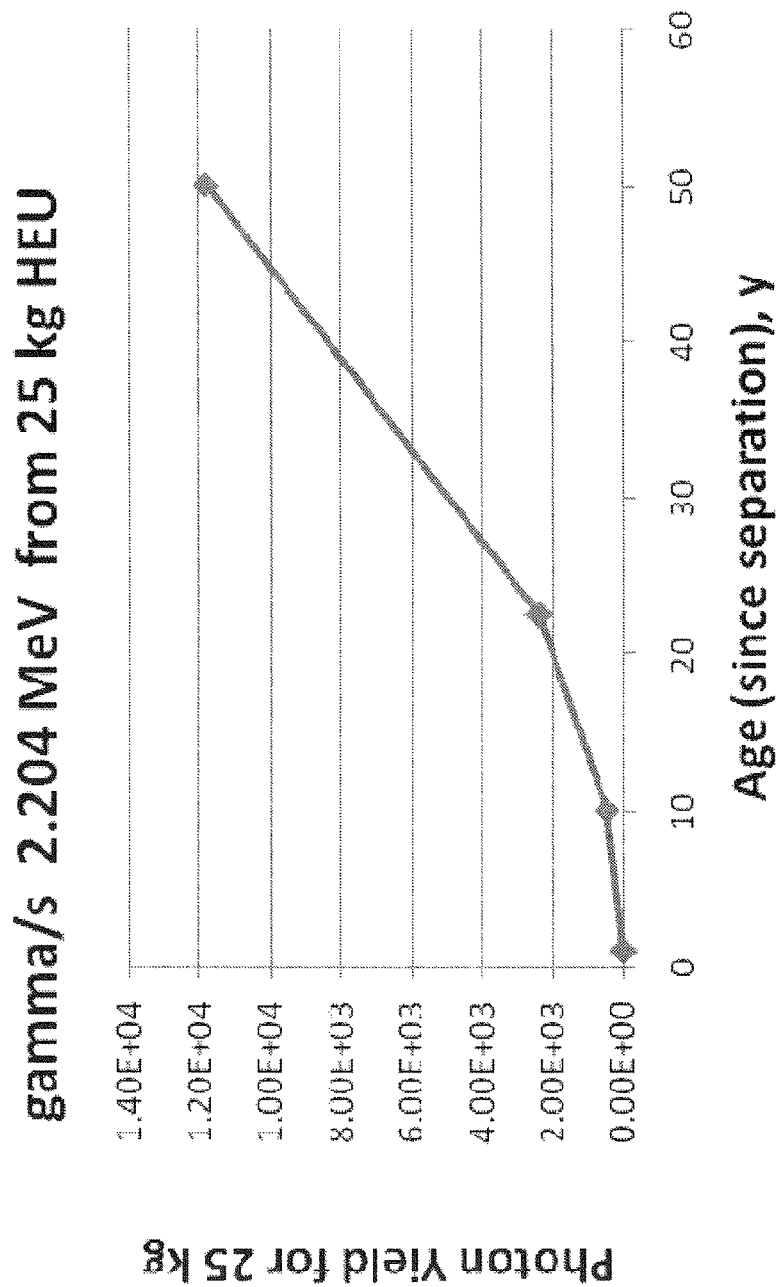
FIG. 5 is a plot of the behavior of 2.204 MeV gamma line emission over time for a 25 kg source.

Taking, for example, the 2.204 MeV gamma, which is attributed to Bi-214 in-growth, FIG. 5 shows the fundamental decay gamma source yields for this line in the source material, demonstrating the behavior as a function of age determined for 1, 10, 22.5, and 50 years since separation of the 25 kg HEU mass.

TABLE 3

Source box (+x) planar leakage current values and attributed isotopes rendered using MC transport for 25 kg HEU (90%) masses canned in 1 cm thick Al

| [A] | [B] | [C] % | [D] | [E] | [F] | [G] | [H] % | [I] | [J] | [K] | [L] % |
|---|---|---|---|---|---|---|---|---|---|---|---|
| 1.000 | 763.1 | 0.19 | Pa-234m | 3.45 | 1.000 | 2629.5 | 0.09 | 1.00 | 1.000 | 763.4 | 0.15 |
| 1.001 | 763.9 | 0.19 | Pa-234m | 3.44 | 1.001 | 2626.5 | 0.09 | 1.00 | 1.001 | 762.4 | 0.15 |
| 1.120 | 409.5 | 0.17 | Pa-234m, Pb-211, Bi-214, Ac-228 | 3.35 | 1.120 | 1373.0 | 0.09 | 0.02 | 1.120 | 6.5 | 0.17 |
| 1.155 | 46.7 | 0.18 | Pa-234 | 3.34 | 1.155 | 156.3 | 0.09 | 0.01 | 1.155 | 0.3 | 1.02 |
| 1.193 | 49.8 | 0.21 | Pa-234m, Pb-211 | 3.00 | 1.193 | 149.6 | 0.11 | 0.65 | 1.193 | 32.4 | 0.13 |
| 1.238 | 171.1 | 0.17 | Pa-234m, Pb-211, Bi-214 | 3.32 | 1.238 | 567.7 | 0.09 | — | 1.238 | 0.3 | 0.89 |
| 1.377 | 143.6 | 0.15 | Bi-214 | 3.16 | 1.377 | 453.2 | 0.08 | 0.03 | 1.377 | 4.0 | 0.29 |
| 1.385 | 30.9 | 0.21 | Bi-214 | 3.10 | 1.385 | 95.6 | 0.11 | 0.05 | 1.385 | 1.5 | 0.47 |
| 1.401 | 45.1 | 0.16 | Bi-214 | 3.23 | 1.401 | 145.5 | 0.08 | — | 1.401 | 0.2 | 1.19 |
| 1.407 | 43.8 | 0.18 | Bi-214 | 3.18 | 1.407 | 139.1 | 0.09 | 0.02 | 1.407 | 1.1 | 0.57 |
| 1.408 | 40.5 | 0.16 | Bi-214, Pa-234m | 3.23 | 1.408 | 130.8 | 0.09 | 0.01 | 1.408 | 0.2 | 1.20 |
| 1.509 | 78.7 | 0.16 | Bi-214, Pa-234m | 3.16 | 1.509 | 248.8 | 0.08 | 0.02 | 1.509 | 1.3 | 0.54 |
| 1.510 | 34.9 | 0.16 | Bi-214, Pa-234m | 3.19 | 1.510 | 111.4 | 0.08 | 0.99 | 1.510 | 34.4 | 0.13 |
| 1.661 | 42.8 | 0.16 | Bi-214, Pa-234 | 3.14 | 1.661 | 134.5 | 0.09 | 0.01 | 1.661 | 0.4 | 1.01 |
| 1.729 | 115.3 | 0.15 | Bi-214, Pa-234m | 3.12 | 1.729 | 359.9 | 0.08 | 0.01 | 1.729 | 0.9 | 0.66 |
| 1.738 | 58.4 | 0.15 | Pa-234, Pa-234m | 3.15 | 1.738 | 183.9 | 0.08 | 0.99 | 1.738 | 58.0 | 0.12 |
| 1.764 | 587.3 | 0.15 | Bi-214, Pa-234m | 3.14 | 1.764 | 1845.0 | 0.08 | — | 1.764 | 0.5 | 0.58 |
| 1.831 | 47.2 | 0.15 | Pa-234 | 3.12 | 1.831 | 147.4 | 0.08 | 1.00 | 1.831 | 47.1 | 0.12 |
| 1.847 | 81.0 | 0.15 | Pa-234 | 3.12 | 1.847 | 252.7 | 0.08 | — | 1.847 | 0.3 | 0.78 |
| 2.118 | 48.9 | 0.15 | Bi-214 | 3.08 | 2.118 | 150.5 | 0.08 | — | 2.118 | 0.0 | 0.16 |
| 2.204 | 201.2 | 0.14 | Bi-214 | 3.09 | 2.204 | 620.9 | 0.08 | — | 2.204 | 0.1 | 0.12 |
| 2.447 | 64.7 | 0.14 | Bi-214 | 3.06 | 2.447 | 198.1 | 0.08 | — | 2.447 | 0.0 | 0.38 |

Figure 6:
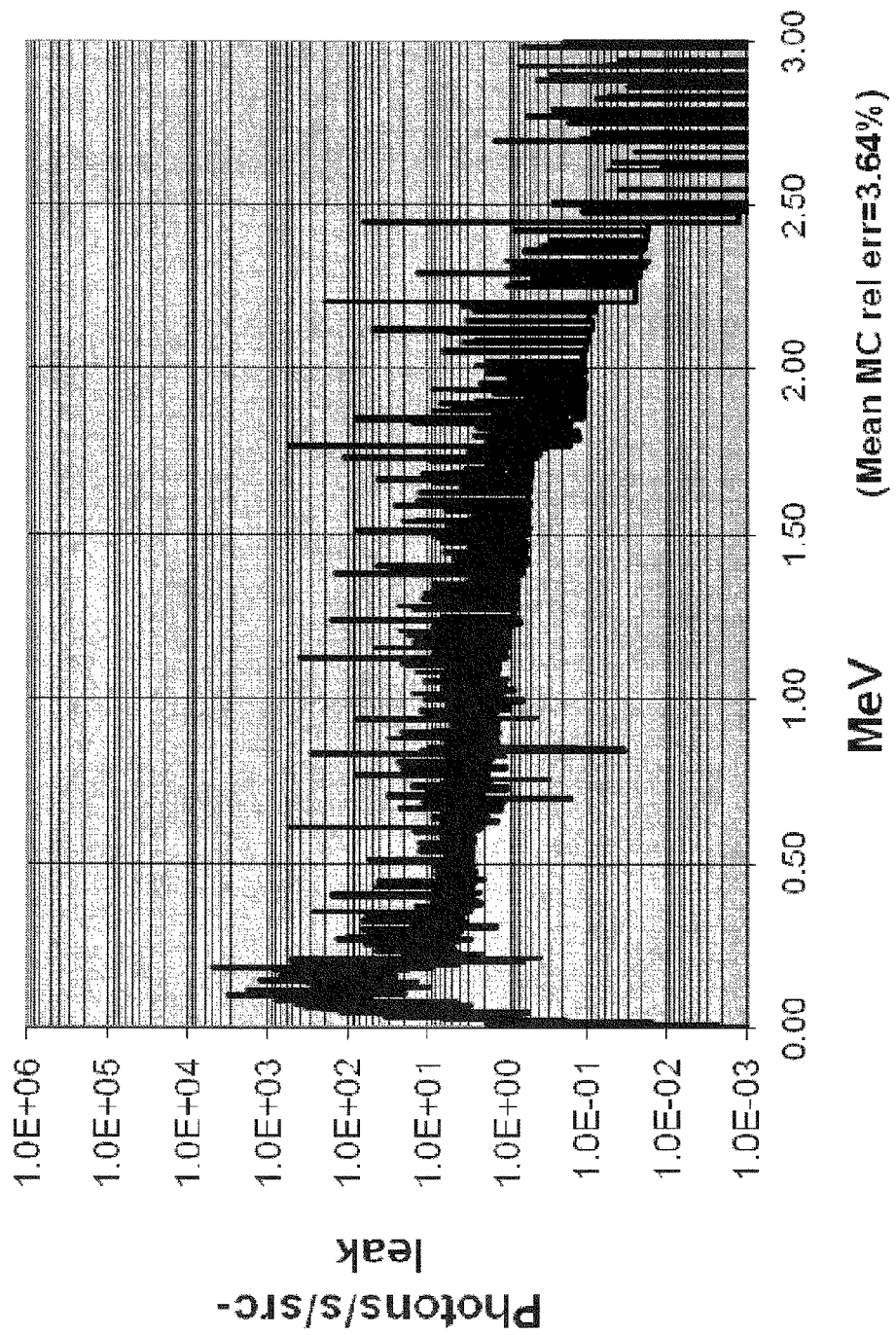
FIG. 6 is a plot of the difference between gamma energy leakages of the one year and fifty year aged HEU.

[A] - Gamma MeV
[B] - 50 yr. Solid Core J+ gam/s, Box Surface
[C] - 50 yr. Solid relative MC error
[D] - Attributed Nuclide(s) in HEU Decay Chain
[E] - Shell/Solid Ratio
[F] - Gamma MeV
[G] - 50 yr. Shell Core J+ gam/s, Box Surface
[H] - 50 yr. Shell relative MC error
[I] - 1 yr. Solid/50 yr. Solid Ratio
[J] - Gamma MeV
[K] - 1 yr. Solid Core J+ gam/s, Box Surface
[L] - 1 yr. Solid relative MC error The absolute value of the difference between the two materials (one year and fifty years) is shown graphically in FIG. 6.

It was further determined that, for HEU sources of the same age since separation, shell sources provide more than three times (3×) the gamma strength compared to solid sources for gamma energies above 1 MeV. Further, exploitable gamma signatures for uranium improve with age; much of the improvement is driven by Bi-214 related daughter in-growth. Aged uranium does not achieve a significant advantage over uranium separated within 1 year until the age of the uranium exceeds at least twenty years. There are also at least seven (7) other gamma lines that should be considered for 1 year HEU that may be used with the present invention, even with heavy shielding from a localized source. Such energies are 0.742, 0.766, 1.0005, 1.193, 1.510, 1.738, and 1.831 MeV gammas. It should be noted that for all plots herein, since gamma sources were broken down to 1 KeV bin resolution, the 1.0005 MeV gamma line counts are split between the 1.000 and 1.001 bins.

Figure 7:
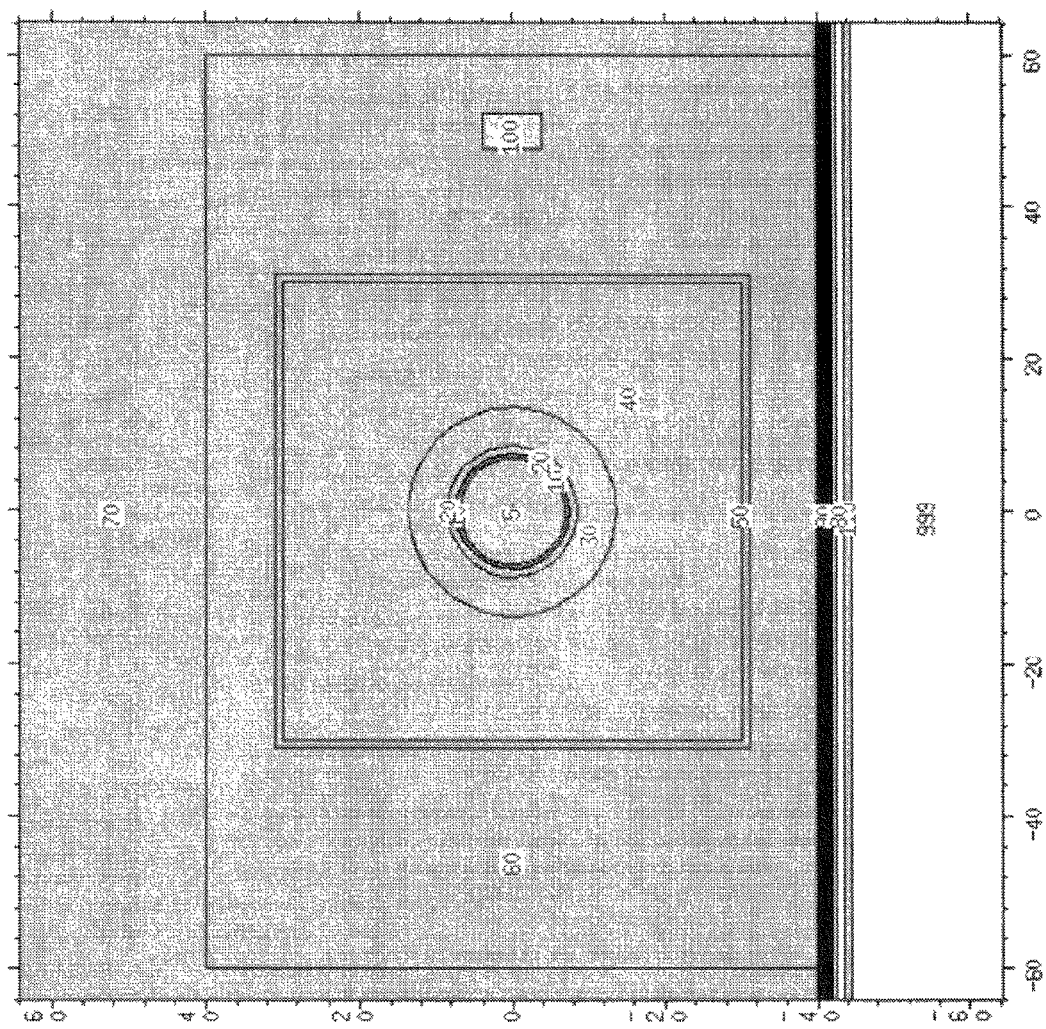
FIG. 7 is a diagrammatic view of a 25 kg HEU shell source shielded with 1 cm of aluminum with a 30 cm radius source box.
Figure 8:
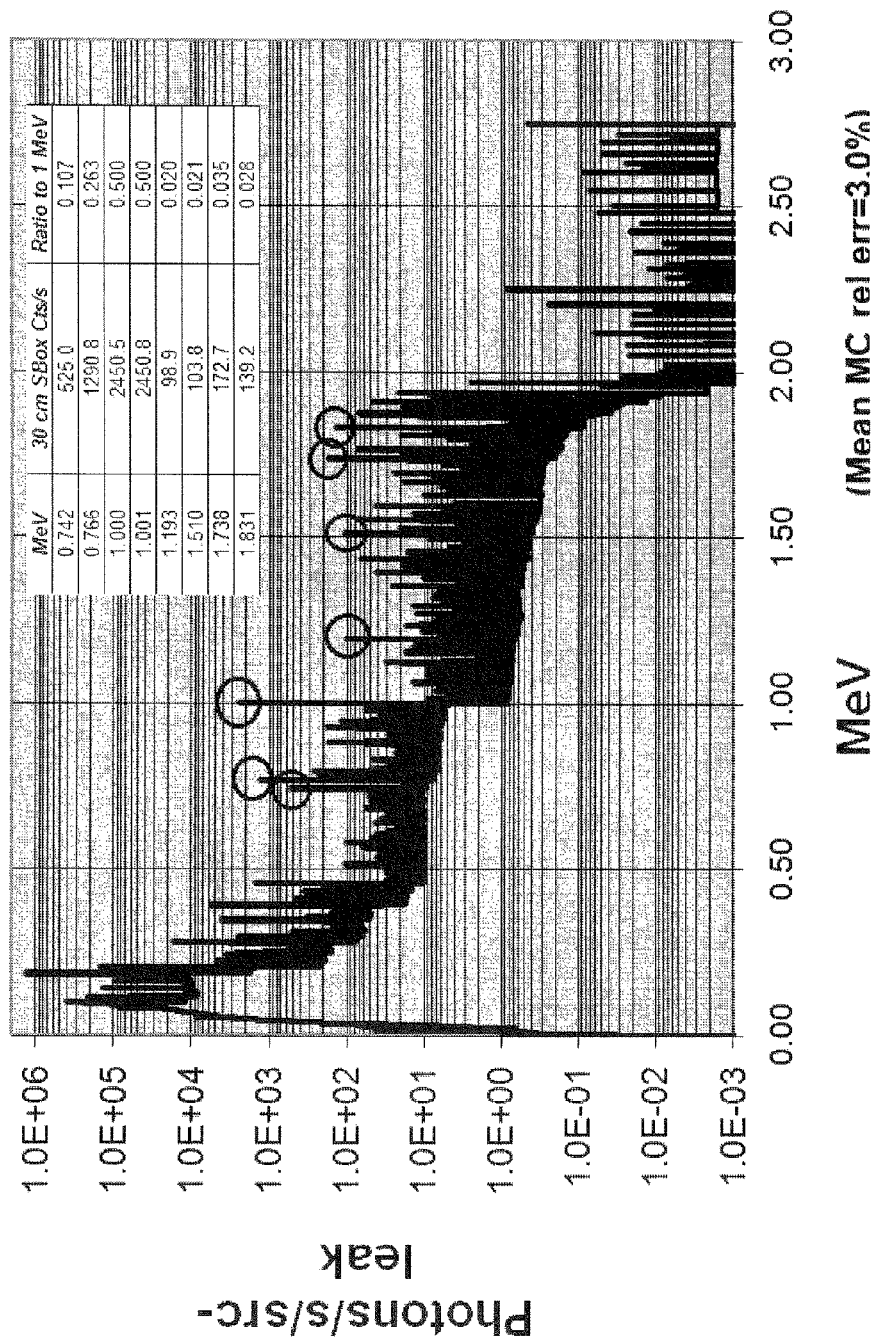
FIG. 8 is a plot of gamma energy leakage for 25 kg one year HEU shell source shielded with 1 cm of Al at a 30 cm radius source box.
Figure 9:
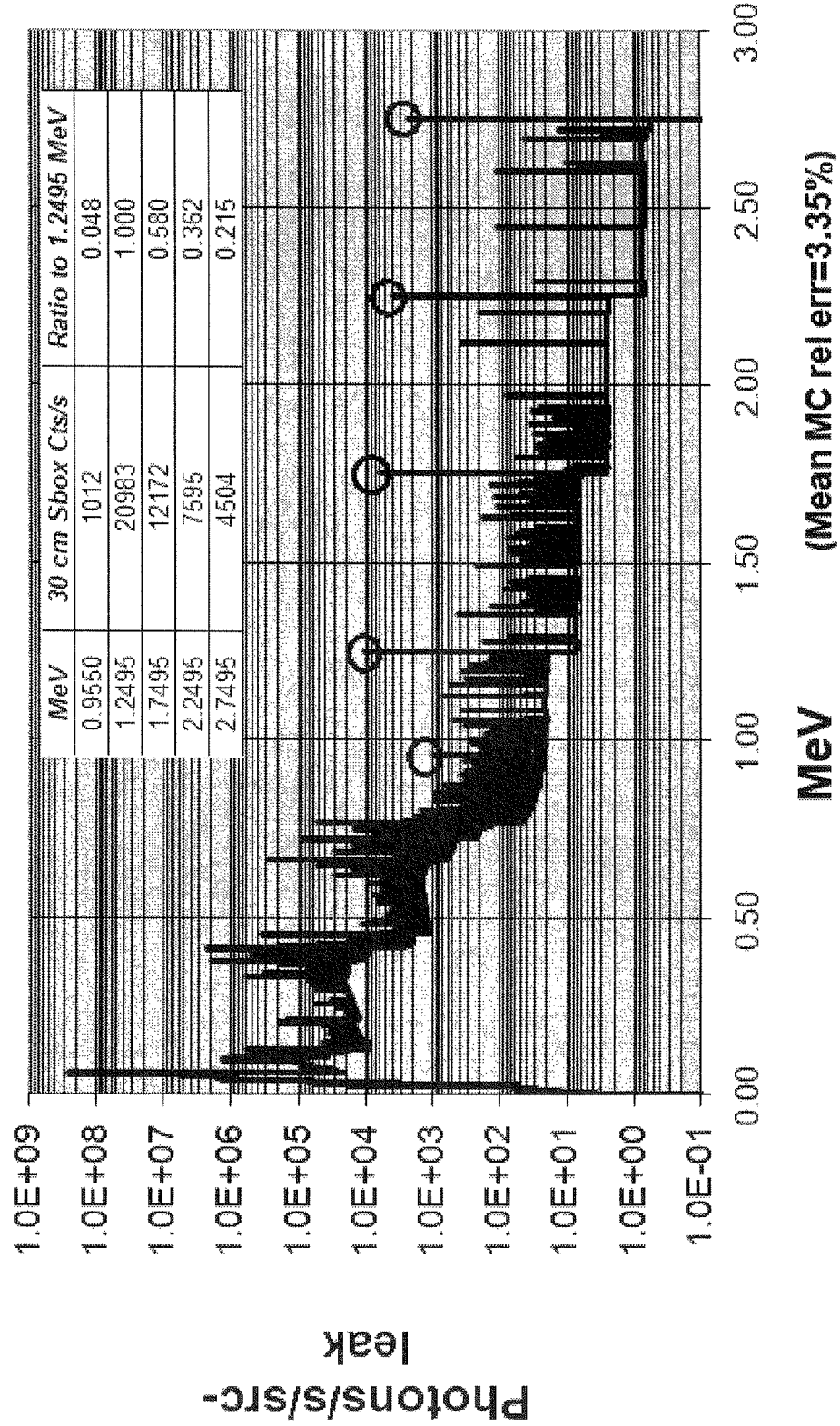
FIG. 9 is a plot of gamma energy leakage for 8 kg 22.5 year WGPu shell source shielded with 1 cm of Al at a 60×60 cm source plane centered 30 cm away.

FIG. 7 shows a 25 kg HEU shell source (13.0866 cm outer radius) shielded with 1 cm of Al, with a 30 cm radius Source Box as modeled using MCNP5. The bottom surfaces represent the wood floor and steel shell (homogenized with air over 1 cm) of the shipping container. FIG. 8 shows the gamma radiation leakage for 1 year aged 25 kg HEU shell source shielded with 1 cm of Al, in the 30 cm radius Source Box. The inset data shows the count rate and ratio to 1 MeV at the source box. FIG. 9 shows gamma radiation leakage for 22.5 year aged WGPu at a 60 cm by 60 cm source plane centered 30 cm away from an 8 kg shell source canned in 1 cm thick aluminum.

Figure 10:
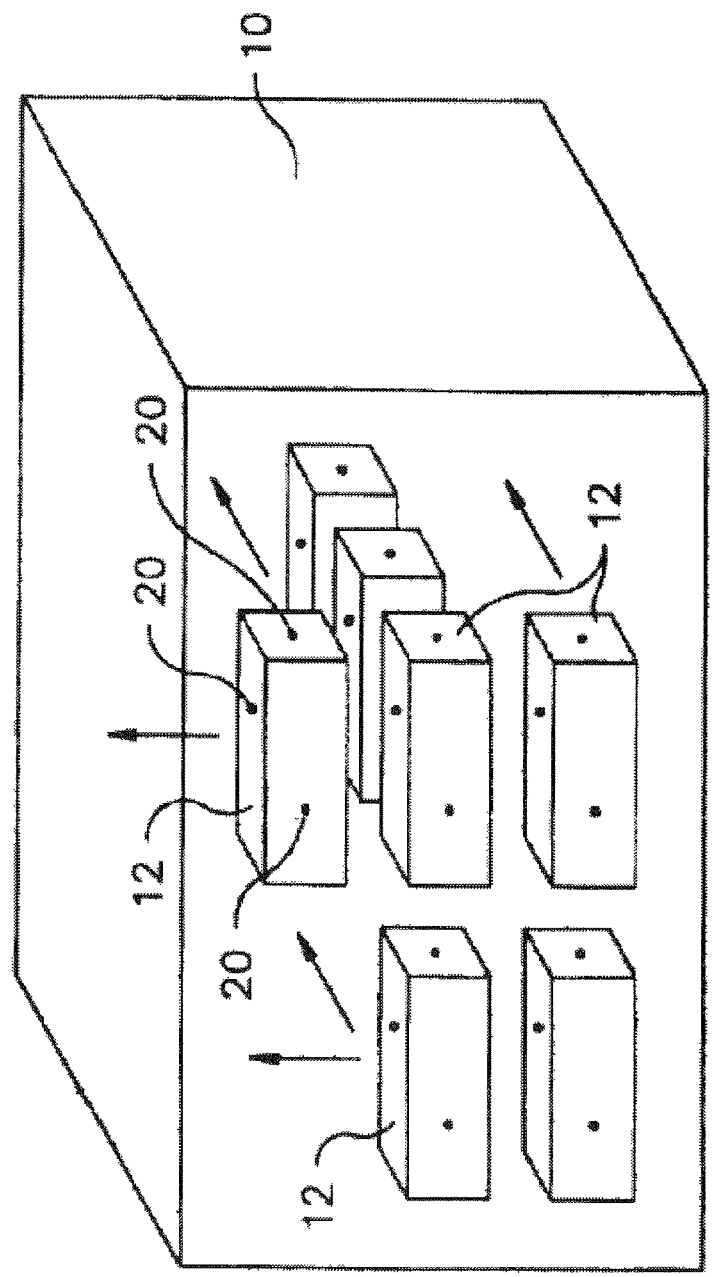
FIG. 10 is a functional block diagram of a radioactive material detection system for use in a preferred embodiment of the present invention.

In one embodiment, the above-described method may be implemented using a system such as that described by U.S. Provisional Patent Application No. 60/388,512 and U.S. Pat. No. 6,891,470, the entire contents of each of which are incorporated by reference herein. For example, FIG. 10 shows a schematic representation of a container storage facility or transport 10, which in this particular example may store a plurality of box-like containers or other objects to be tested 12. For example, the containers 12 may be preloaded with goods to be shipped from one location to another. Typically, the containers 12 preloaded with the goods to be shipped are sealed before being placed in a transport, such as a ship or truck. Shipping containers 12 of this type are typically made of steel or some other rigid, high strength material in order to provide adequate support and to adequately protect the goods being shipped within each container 12 from damage which may occur during shipment and the loading/unloading of the containers 12.

Figure 11:
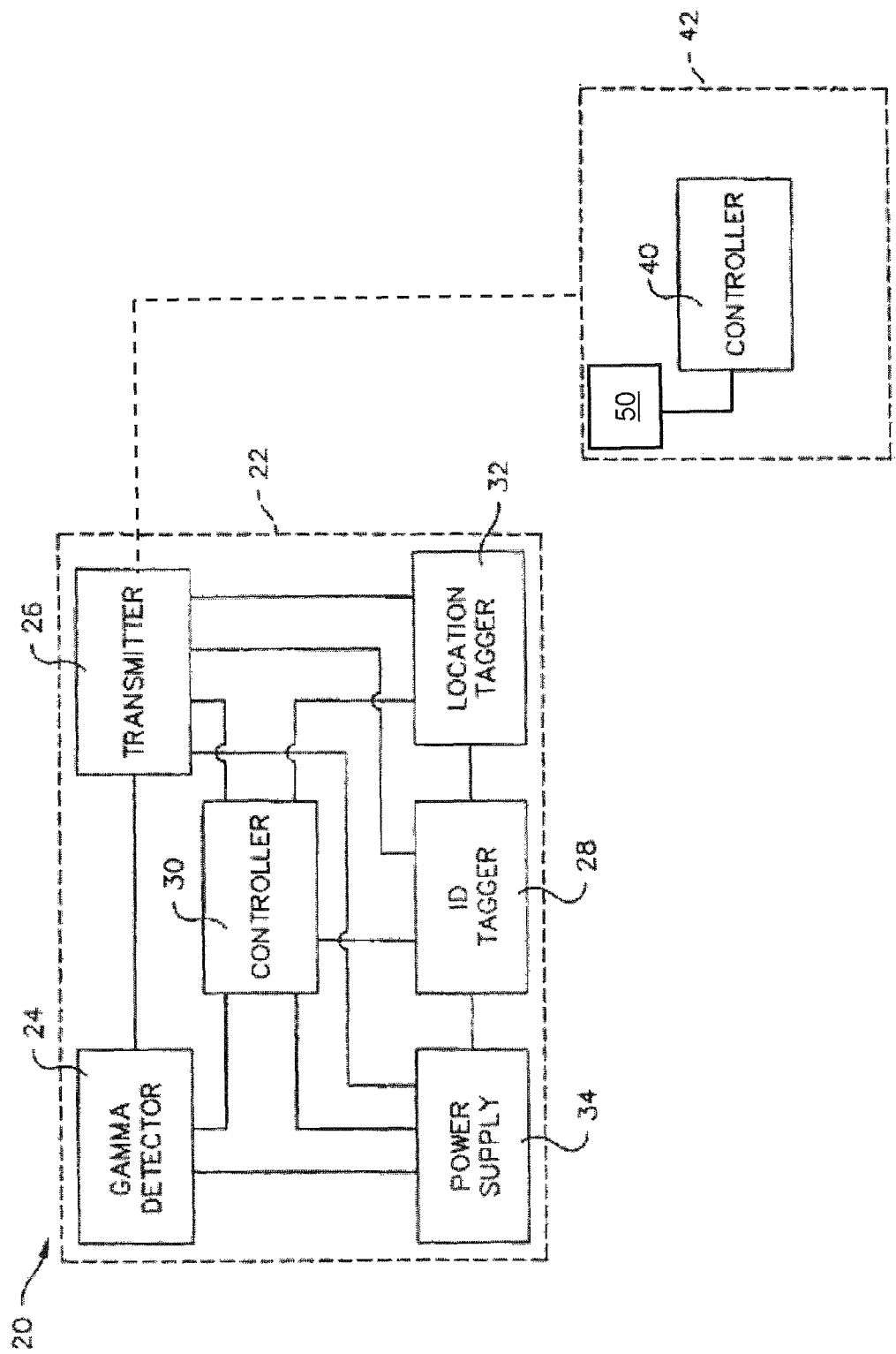
FIG. 11 is a schematic functional block diagram of a radioactive material detection apparatus for use in preferred embodiments of the present invention.

FIG. 11 is a functional schematic block diagram of a radioactive material detection apparatus 20 in accordance with a preferred embodiment of the present invention. The radioactive material detection apparatus 20 is contained within a housing 22 which is preferably sealed and is made of a generally rigid high strength material such as a polymeric material. Preferably, the sensor housing 22 is tamper resistant and includes a mechanism for identifying by a quick, visual or other inspection whether the housing 22 has been opened or otherwise tampered with and or an internal electronic circuit to detect tampering. The housing 22 is adapted to be secured to the inside or outside of a container 12 at a predetermined location. Various techniques and methods well known to those of ordinary skill in the art may be employed for securing the housing 22 to the container 12 including the use of one or more mechanical fasteners such as screws, bolts, clamps, or the like, the use of an adhesive or epoxy adhesive, suction cups, a magnetic attachment device or any other suitable attachment device or technique. Preferably, the housing 22 is adapted to be temporarily secured to an interior or exterior surface of the container 12. Thus, the radioactive material detection apparatus 20 may be a portable unit. However, it is within the scope and spirit of the present invention that the housing 22 be permanently secured to a container 12. Preferably, the location on the container 12 where the housing 22 is secured will be such that the housing 22 will not affect the loading or unloading of the container 12 or the stacking of the containers 12. Preferably, the housing 22 is relatively small as compared to the container 12 or other object to be tested.

Referring again to FIG. 11, the housing 22 contains the components necessary for passive detection of the presence of radioactive material over an extended time period. For example, the containers 12 may be tested during the time period in which the container transport 10 moves from one destination to another. In the present embodiment, the housing 22 includes a gamma radiation detection sensing component or sensor 24, a transmitter 26, an identification component or ID tagger 28, a controller 30, a location component or tagger 32 and a power source 34 for providing operating power to the other components as needed. Preferably, the gamma radiation sensor component 24 is a self-contained passive device capable of sensing the presence of gamma radiation emitted from radioactive material which may be present within or near the container 12 to which the radioactive material detection apparatus 20 is attached. The gamma radiation sensing component 24 is preferably of a type which is generally well known to those of ordinary skill in the art and is available from several sources. The gamma radiation sensing component 24 provides an electrical output signal which is proportional to the sensed gamma radiation. The output from the gamma radiation sensing component 24 may be supplied as an input to the controller 30, which may be configured to perform the ratio calculations of the detected gamma photon ranges, as well as determined whether a threshold ratio has been exceeded. Alternatively, the output of the gamma radiation sensing component 24 may be supplied as an input to the transmitter 26. The transmitter 26 communicates with an external controller 40, which receives the data signal representing the gamma photon counts for use in determining the ratio and preferably the determination of the radioactive anomaly. The external controller 40 may be housed in an external computing device 42, such as a base station computer, portable device, or the like. The output of the radiation sensor 24 may be output to the transmitter 26 once following the entire testing period, or may be accumulated over multiple intervals of time and sent in portions to the transmitter 26. Suitable signal conditioning components (not shown) may be interposed between the gamma radiation sensing component 24 and the transmitter 26.

Optionally, one of the controllers 30, 40 may be coupled to an indicator 50, such as a visual or audible alarm, which alerts operators that a threshold value of the gamma ratio has been exceeded, or other conditions.

Figure 12:
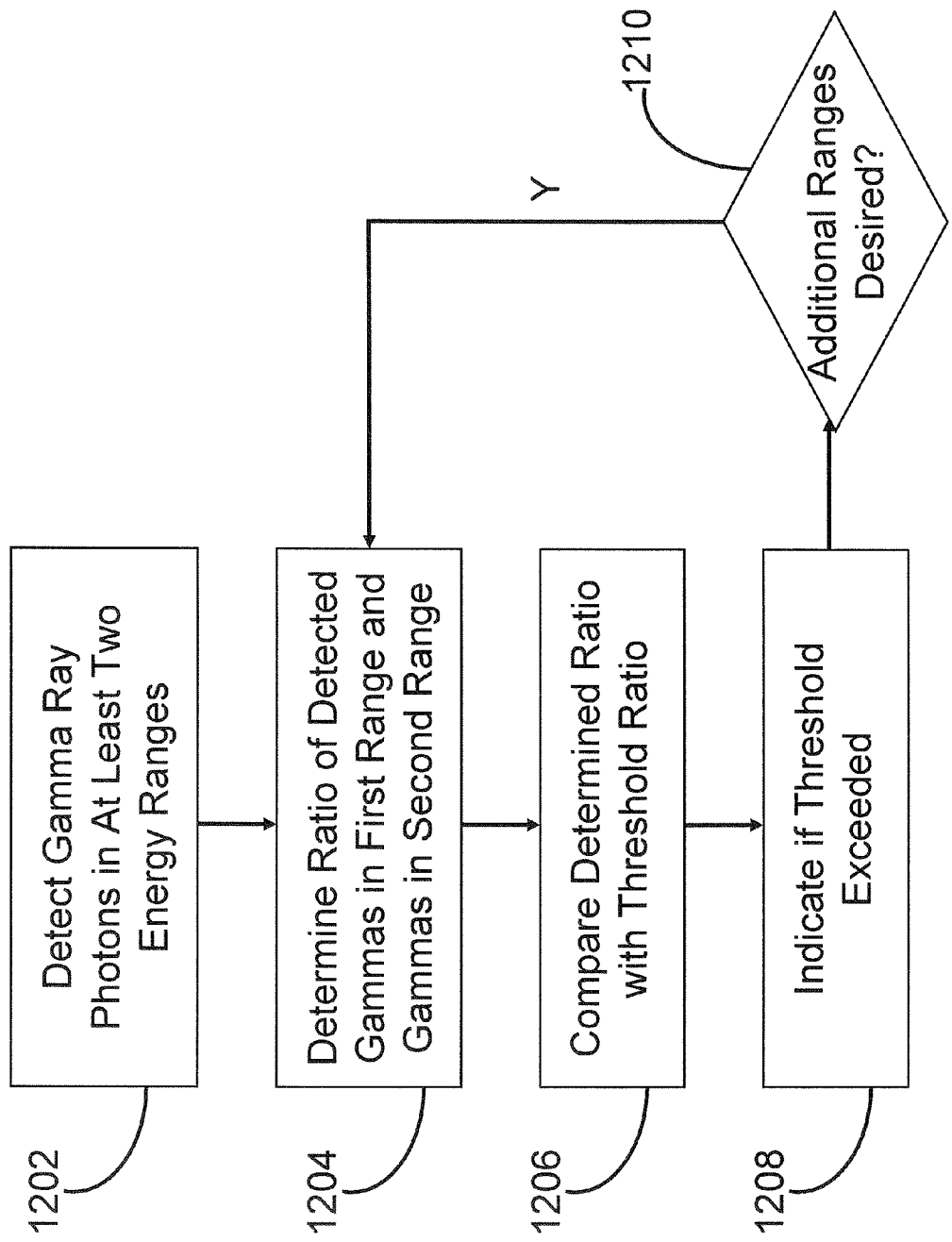
FIG. 12 is a flowchart of a first method in accordance with a preferred embodiment of the present invention.

FIG. 12 is a flow chart for one embodiment of a method utilizing the above-described ratios for detection of a radioactive anomaly. At step 1202, one or more radioactive material detection apparatuses 20 detect gamma photons having energies within at least two ranges of energy values. At step 1204, the data is fed to a controller 30 or 40 for analysis and computation a ratio of the number of detected gamma photons in a first range and the number of detected gamma photons in a second range. In this particular embodiment, at step 1206, the calculated ratio is compared to a threshold value, such as the ratio for NORM. If the threshold is exceeded, at step 1208 the presence of a radioactive anomaly is indicated.

It is conceivable that with knowledge of the first and second ranges, nefarious individuals may attempt to dope the material to be tested with particular isotopes in an effort to have the ratio appear to be similar to NORM. The testing for additional ratios at step 1210 can compensate for this effect. For example, embodiments of the present invention allow for the determination of additional ranges, which may overlap with one or more of the first and second ranges, from which additional ratios may be calculated for the detection of a radioactive anomaly. As one example, if the first ratio compares 830-1060 keV gamma counts with 1060-3000 keV gamma counts, a secondary check ratio may compare 1000-2000 keV gamma counts with 2000-2500 keV gamma counts. As another example, the secondary check ratio may compare 830-1060 keV gamma counts with gamma counts in the 2500-3000 keV range. By performing multiple ratio calculations with varying ranges, it becomes even more difficult to hide weapons grade materials.

Figure 13:
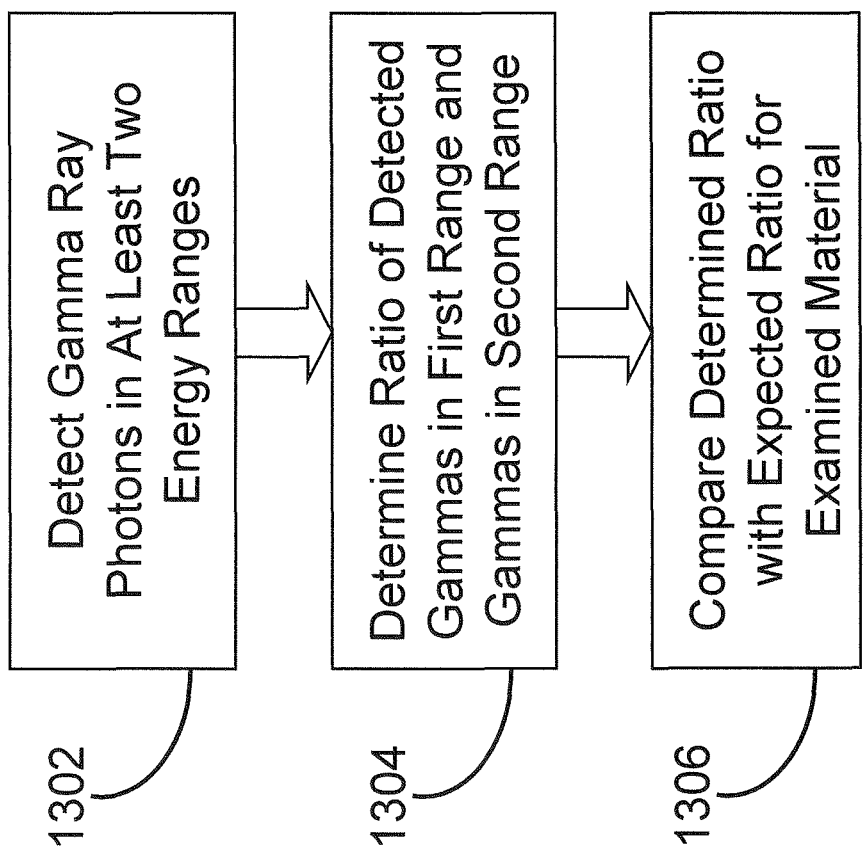
FIG. 13 is a flowchart of a second method in accordance with another preferred embodiment of the present invention.

In another preferred embodiment, gamma energy spectrum ratios may be used for materials verification. For example, the technique may be used to verify the counts of nuclear warheads in storage. In this instance, an expected ratio for the warhead within container 12 can be determined based on the age of the warhead. FIG. 13 is a flow chart representing this method embodiment. At step 1302, one or more radioactive material detection apparatuses 20 detect gamma photons having energies within at least two ranges of energy values. At step 1304, the data is fed to a controller 30 or 40 for analysis and computation a ratio of the number of detected gamma photons in a first range and the number of detected gamma photons in a second range. In this particular embodiment, at step 1306, the calculated ratio is compared to the expected value for the warhead. If the calculated ratio and expected ratio do not match, there is reason to suspect that the warhead had been replaced by "dummy" material.

The above provides only examples for using gamma energy spectrum ratios for detecting the presence or absence of radioactive materials in storage or shipping, and is not meant to be limiting. It will be appreciated that the invention is not limited to homeland security or discrimination during shipping or storage, and can be used for a variety of different purposes requiring discrimination of HEU or other materials of interest from naturally occurring radioactive materials.

From the foregoing, it can be seen that embodiments of the present invention comprise a method of discriminating a radioactive anomaly, particularly HEU from naturally occurring radioactive materials. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for discriminating a radioactive anomaly from naturally occurring radioactive materials, the method comprising:

detecting a first number of gamma photons having energies for each of a first plurality of gamma energy lines within a predetermined period of time;

detecting a second number of gamma photons having energies for each of a second plurality of gamma energy lines within the predetermined period of time;

summing together the first numbers of gamma photons from each of the plurality of first gamma energy lines to obtain a first gamma photon total;

summing together the second numbers of gamma photons from each of the plurality of second gamma energy lines to obtain a second gamma photon total;

determining, in a controller, a ratio of the first gamma photon total and the second gamma photon total; and determining that a radioactive anomaly is present when the ratio exceeds a threshold value.

2. The method of claim 1, wherein the radioactive anomaly is highly enriched uranium (HEU).

3. The method of claim 2, wherein each of the first gamma energy lines is between about 830 keV and about 1060 keV.

4. The method of claim 3, wherein each of the second gamma energy lines is between about 1060 keV and about 3000 keV.

5. The method of claim 4, wherein the threshold value represents naturally occurring radioactive material (NORM) and is about 0.43.

6. The method of claim 1, further comprising:

detecting a third number of gamma photons having energies for each of a third plurality of gamma energy lines within the predetermined period of time;

detecting a fourth number of gamma photons having energies for each of a fourth plurality of gamma energy lines within the predetermined period of time;

summing together the third numbers of gamma photons from each of the plurality of third gamma energy lines to obtain a third gamma photon total;

summing together the fourth numbers of gamma photons from each of the plurality of fourth gamma energy lines to obtain a fourth gamma photon total; and determining, in the controller, a ratio of the third gamma photon total and the fourth gamma photon total.

7. The method of claim 6, wherein all of the third and/or the fourth gamma energy lines lie in a different energy range from the plurality of first and second gamma energy lines.

8. The method of claim 7, wherein the energy range containing the third and/or fourth gamma energy lines ranges overlaps with a range containing the plurality of first and/or second gamma energy lines.

9. The method of claim 1, further comprising:

placing one or more radioactive material detection apparatuses onto an object to be tested, the one or more radioactive material detection apparatuses being configured to detect the first and second numbers of gamma photons.

10. The method of claim 9, wherein at least one of the one or more radioactive material detection apparatuses includes the controller for determining the ratio of the first and second gamma photon totals.

11. The method of claim 9, wherein the controller for determining the ratio of the first and second gamma photon totals is located remotely from the one or more radioactive material detection apparatuses, the method further comprising:

transmitting, from the one or more radioactive material detection apparatuses, data representative of the detected first and second numbers of gamma photons to the controller.

12. The method of claim 1, wherein the controller determines that the threshold value is exceeded by the ratio of the first and second gamma photon totals.

13. The method of claim 12, wherein the controller provides a warning indication when the threshold value is exceeded.

14. The method of claim 1, wherein the radioactive anomaly is plutonium.

15. A method for determining the presence or absence of an expected radiation source, the method comprising:
- placing at least one radioactive material detection apparatus on an object containing the expected radiation source;
- detecting, with the at least one radioactive material detection apparatus, a first number of gamma photons emitted by the expected radiation source having energies for each of a first plurality of gamma energy lines within a predetermined period of time;
- detecting, with the at least one radioactive material detection apparatus, a second number of gamma photons emitted by the expected radiation source having energies for each of a second plurality of gamma energy lines within the predetermined period of time;
- summing together the first numbers of gamma photons from each of the plurality of first gamma energy lines to obtain a first gamma photon total;
- summing together the second numbers of gamma photons from each of the plurality of second gamma energy lines to obtain a second gamma photon total;
- determining, in a controller, a ratio of the first gamma photon total an the second gamma photons photon total; and
- comparing the determined ratio of the first and second gamma photon total with an expected ratio of the first and second gamma photon total for the expected radiation source.

16. A system for discriminating a radioactive anomaly from naturally occurring radioactive materials, the system comprising:
- at least one radioactive material detection apparatus configured to detect a first number of gamma photons having energies for each of a first plurality of gamma energy lines within a predetermined period of time and a second number of gamma photons having energies for each of a second plurality of gamma energy lines within the predetermined period of time; and
- a controller configured to:
  (i) determine a ratio of a sum total of the first number of gamma photons from each of the first plurality of gamma energy lines and a sum total of the second number of gamma photons from each of the second plurality of gamma energy lines, and
  (ii) compare the determined ratio with a threshold value.

17. The system of claim 16, wherein the controller is remotely located from and in communication with the at least one radioactive material detection apparatus.

18. The system of claim 17, wherein the at least one radioactive material detection apparatus is configured to communicate wirelessly with the controller.

19. The system of claim 18, wherein the controller is housed by the at least one radioactive material detection apparatus.

* * * * *